Patented June 24, 1930

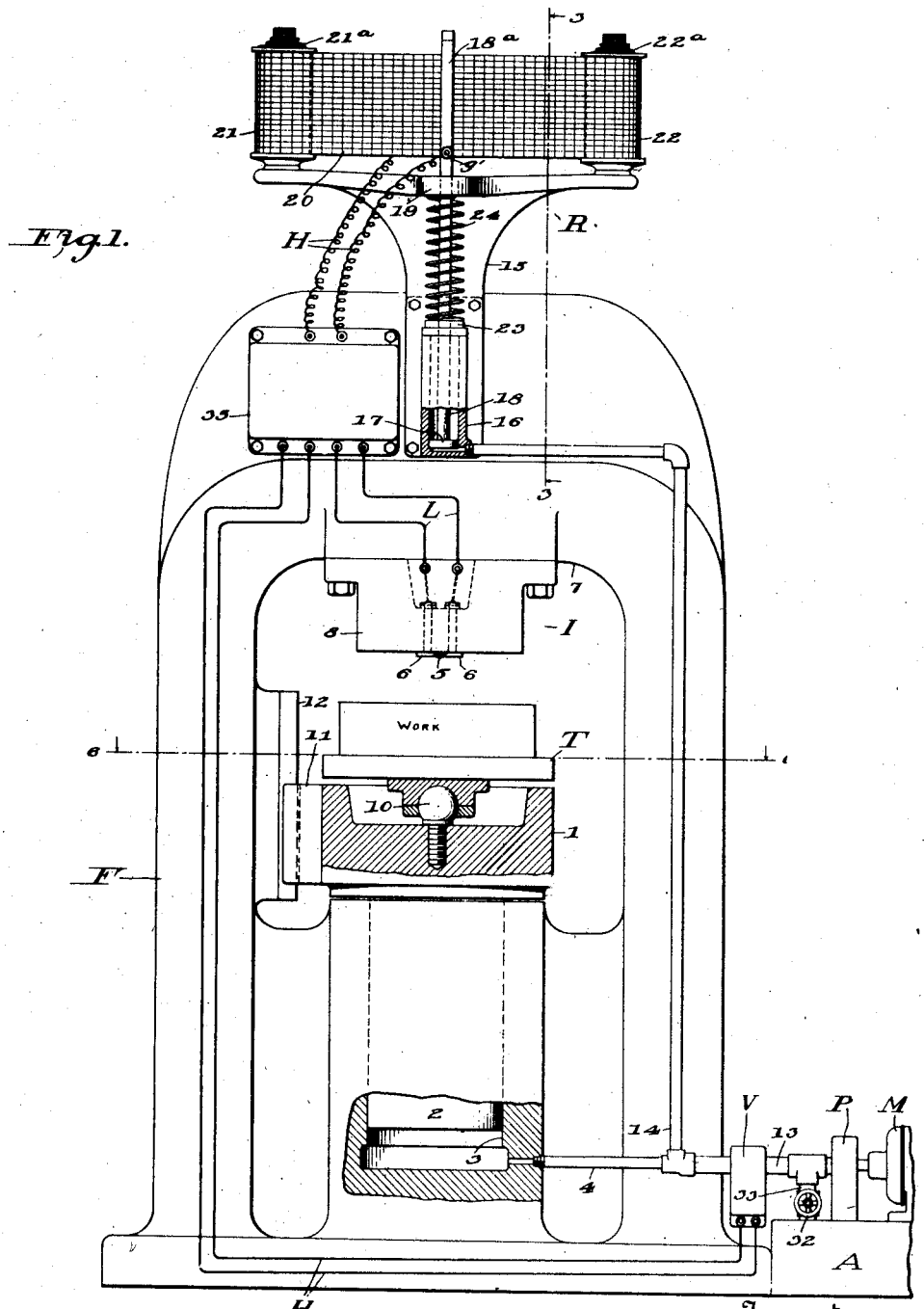

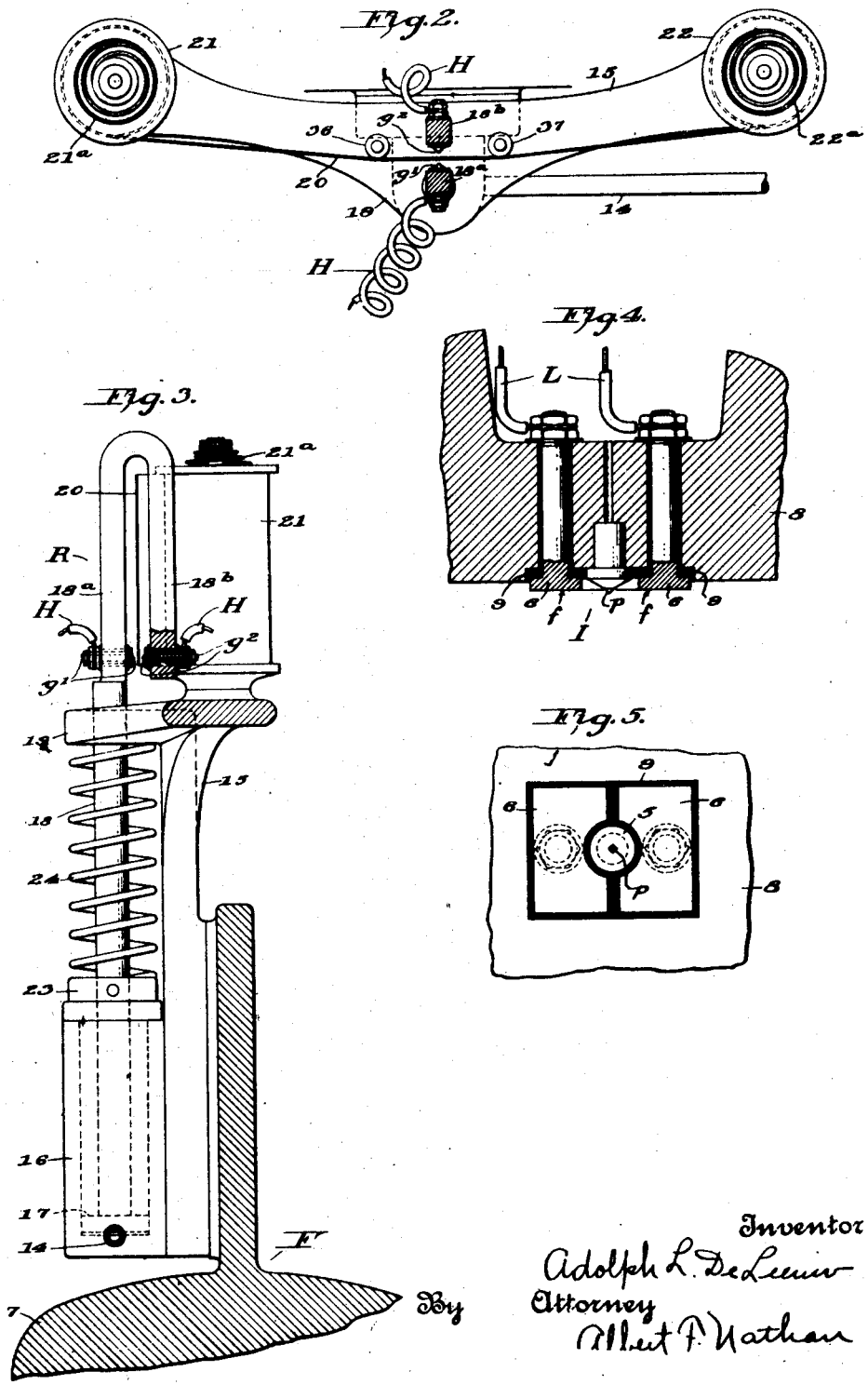

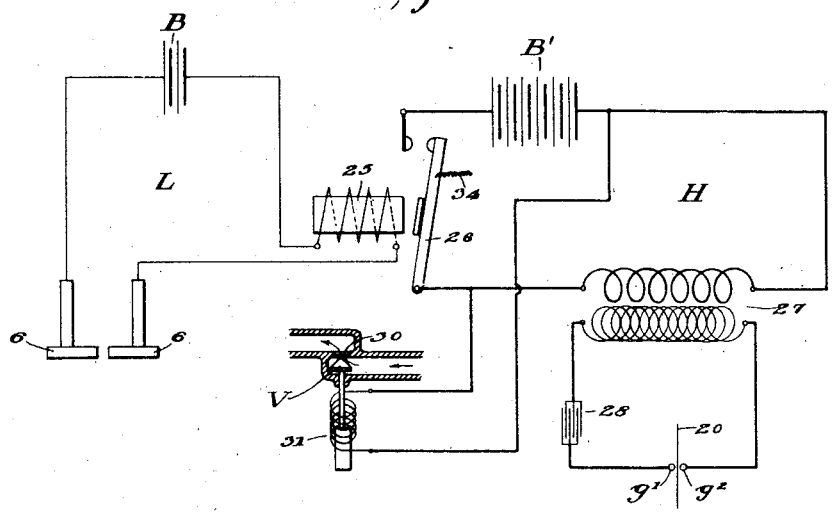
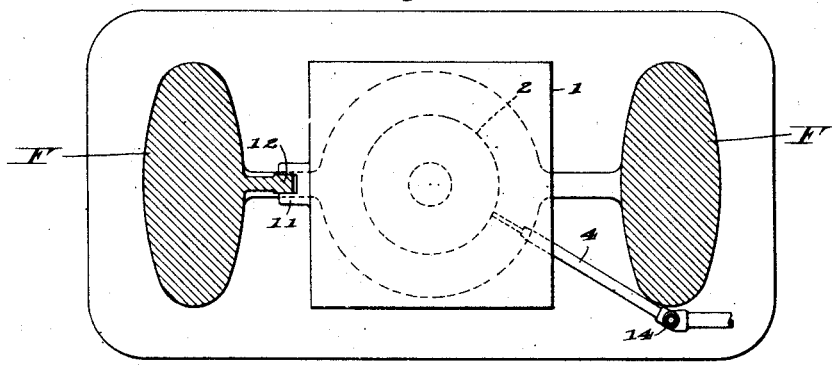
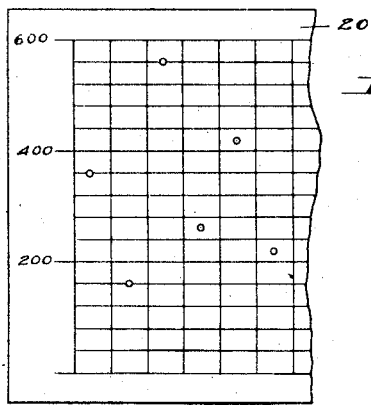

1,768,512

UNITED STATES PATENT OFFICE

ADOLPH L. DE LEEUW, OF PLAINFIELD, NEW JERSEY, ASSIGNOR OF ONE-HALF TO ALBERT F. NATHAN, OF NEW YORK, N. Y.

HARDNESS-MEASURING MEANS

Application filed October 19, 1925. Serial No. 63,380.

This invention has to do with the testing of metals and it deals particularly with methods of and machines for accurately ascertaining a certain physical property thereof, to wit, their degrees of hardness.

The present invention is an improvement upon the apparatus and method disclosed in the Patent No. 1,192,670 and it proposes a method of and machine for testing metals, to ascertain their degree of hardness, by causing, in a single operation, a predetermined effect upon the specimen to be tested and simultaneously therewith permanently recording, in standard units of measure, the force required to produce that effect. More specifically stated the principle employed in this invention is the converse of the principle employed in the Brinnell indentation test.

The present invention proposes to cause an indentation, of very accurately predetermined depth, to be made in the surface of the metal to be tested and, instantaneously with the completion of the indentation, automatically and permanently to record the exact pressure required to produce the indentation and inasmuch as the pressure utilized to effect the indentation may be measured and expressed in standard units of measure, such for example as pounds or kilograms per square inch, it will be seen that the reading will be complete in itself and will require no further calculation to ascertain the degree of hardness of the metal.

One practical device by means of which this new method of testing material may be carried out consists of a work-table upon which the work to be tested is placed. Above the work-support is located a hardened point adapted to penetrate the surface of the specimen. The work-support and the point are relatively movable toward each other only perpendicular to the surface to be tested and the movable one (preferably the work-support) may be moved toward the other as by means of fluid pressure. The penetrating point projects slightly beneath a depth gauge, in the nature of spaced anvils, which are adapted to contact with the work thereby limiting the movement thereof toward the point and insuring that the point will be forced into the work precisely the same distance in each successive operation. The recording device (which is rendered effective instantaneously upon the contact of the anvils with the work thereby to record the pressure required to force the point into the work a given distance) may be actuated electrically, the contact between the work and the anvils serving to close a circuit which, through suitable electrical apparatus, causes a spark to jump across a suitable spark-gap. This spark-gap is carried by a vertically shiftable member which is moved against the action of a compression spring by the same pressure per square inch that is utilized to force the point into the work. A suitably ruled paper extends between the points of the shiftable spark-gap and the spark, in its jump across the gap, (when the point has indented the work the predetermined distance) perforates the paper, thereby permanently recording the height of the spark-gap at the time the contact was made, and the position of this perforation with respect to the ruling on the paper indicates the pressure utilized. Thus the degree of hardness of all specimens may be accurately determined and expressed in terms of pressure per square inch necessary to effect a predetermined indentation of the specimens. Means also is provided automatically to discontinue the pressure instantaneously with the completion of the indentation and for resetting the electrically operated devices for a subsequent operation when the work support is lowered to remove the tested work.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a front view, partly in section, of a testing machine embodying the present invention and adapted to carry out the improved method. Fig. 2 is a detail plan of the recording device. Fig. 3 is a view on the line 3—3 of Fig. 1. Fig. 4 is a detail sectional view showing the mounting for the indentation point and the anvils. Fig. 5 is a bottom view of the parts shown in Fig. 4. Fig. 6 is a section on the line 6—6 of Fig. 1. Fig. 7 is a diagrammatic view of the electric circuits for recording the fluid pressure utilized to effect indentation of predetermined depth, and for automatically shutting off the fluid pressure when the predetermined depth has been reached. Fig. 8 is a detail view of a portion of the record sheet upon which the pressure utilized is recorded, illustrating the record produced by a plurality of tests of metal of various degrees of hardness.

Referring more specifically to the drawings the invention is disclosed, in its preferred form, as embodied in an improved testing machine comprising a rigid frame F which carries a work supporting table T, indenting device I, opposed to the work-support, and a recording device R. The work-support and the indenting device are relatively movable toward and from each other and the movable one (preferably the former) may be moved by any suitable means. One convenient way of effecting relative movement between the work-support and the indenting device is disclosed in the drawing, in which the work support is shown carried by the enlarged head 1 of a piston 2, slidingly fitted within a cylinder 3 formed in the base of the frame F. Fluid, under pressure, may be admitted into the cylinder beneath the piston through a pipe 4, to effect upward movement of the piston and work-table. The indenting device, including an indenting tool 5 and depth gauge 6, is carried by a rigid arch-portion 7 of the frame and this arch receives and resists the upward pressure of the work-support, thereby causing the tool 5 to be forced into the work carried on the work-table. As shown more clearly in Fig. 4 the point $p$ of the tool 5 (which may be of any suitable hard material such as a diamond or hard steel) projects slightly beneath the lower faces $f$ of the depth gauge or anvils 6 which are adapted to contact with the work when the point $p$ has indented the work to a predetermined depth, thereby accurately determining the depth of each indentation. The anvils and the indenting tool 5 are preferably, but not necessarily, non-yieldingly supported from the arch 7 in any suitable way, such, for example, as by being carried by a block 8 secured thereto. For certain purposes it may be desirable to have the anvils yieldingly supported and normally maintained in a predetermined gauging position but movable therefrom after the predetermined indention has been made and the force required therefor recorded. To give the anvils maximum bearing surface in the vicinity of the point $p$ they may be so fashioned as to partly encircle the tool as shown in Fig. 5. The work-table is preferably mounted upon a spherical support 10 carried by the head 1 whereby the table is permitted to have universal movement to compensate for variations in the surfaces of the specimen to be tested thereby ensuring that, in every instance, both of the anvils will be caused to contact with the upper surface of the work. The piston 2 may be held against rotation in the cylinder 3 by providing spaced guide-walls 11 on the head 1 and causing them to track a guide 12 provided by the frame F.

Either manual or power means may be employed to supply any suitable fluid under pressure through the pipe 4 into the cylinder 3 to elevate the work-table, but preferably this is effected by a power driven pump P actuated by a motor M. This pump is adapted to draw fluid (preferably oil) from a reservoir A and force it outwardly through a pipe 13. This pipe connects with and supplies fluid to the pipe 4 leading into the cylinder and simultaneously therewith to a pipe 14 forming a part of a recording device. When fluid under pressure is admitted into the cylinder 3 the work-table will be elevated and the work thereon will be brought into contact with the point $p$. A continued upward movement of the work will cause the point to be forced into the work until it has reached the depth corresponding to the distance that the point extends below the anvils, at which time the anvils will contact with the work and thereby prevent further indentation. In the event that the upper surface of the work is not exactly parallel with the lower faces of the anvils, one of the anvils will contact with the work first and upon further upward movement of the piston the work-table will rock upon the ball 10 and cause the work to come into contact with both of the anvils. It will readily be perceived that the harder is the work the greater will be the pressure required to elevate the table sufficiently to force the point into the work the predetermined depth. Now, therefore, by determining this pressure the degree of hardness of the work may be ascertained. It is, of course, desirable that the pressure be determined the instant that the point has reached its predetermined depth and before any material pressure has been transmitted to the anvils. This may be effected by causing the work, in its contact with the two anvils, to close an electric circuit and having the electric circuit record the pressure per square inch in the cylinder 3.

Returning now to the fluid pressure device shown in Fig. 1 it will be seen that inasmuch as both of the delivery pipes 4 and 14 connect with the supply pipe 13 the pressure in both of the delivery pipes will be the same. The pipe 14 has its upper end connected with a cylinder 16 beneath a piston 17 slidable therein. It will therefore be apparent that the pressure per square inch in the cylinders 3 and 16 will always be substantially equal. The piston 17 is fixed upon a rod 18, having a bearing in a boss 19, provided by a bracket 15, which also supports the cylinder 16. The upper end of the rod 18 is turned back upon itself thereby providing spaced legs 18$^a$ and 18$^b$ which straddle a record sheet 20 suitably ruled and wound upon spools 21 and 22. The legs 18$^a$ and 18$^b$ carry, at opposite sides of the record sheet electric terminals $g^1$ and $g^2$ which constitute a spark-gap later to be referred to. Surrounding the rod 18, intermediate the boss 19 and a collar 23 fixed to the rod, is a compression spring 24 which constantly exerts a predetermined pressure downwardly on the rod 18. This pressure may be of any suitable amount but for convenience of description let it be supposed that it together with the weight of the piston 17, rod 18 and attached parts is thirty kilograms. Now it will be seen that as fluid is admitted into the cylinder 3 the piston 2 will be elevated and the work will be brought into contact with the point $p$. Meanwhile a pressure, equal to the pressure required to lift the piston 2, work-table and work, is also being applied to the underside of the piston 17 but the latter piston will not be moved immediately because of the back pressure exerted by the spring 24. Pressure continues to build up in the cylinders 3 and 16 and when the pressure exceeds the back-pressure of the spring 24 the piston 17 and rod 18 start to move upwardly against the action of the spring. Now, suppose that the pressure required to elevate the work-table and the work piece and to sink the point $p$ into the work, until the anvils 6 contact therewith, amounts to three hundred and ninety kilograms, it is obvious that the movement of the rod will represent three hundred and sixty kilograms or three hundred and sixty kilograms less the head of oil in the pipes since the back pressure of the spring 24 acts to prevent movement of the rod until a pressure of thirty kilograms had been applied.

Fig. 7 illustrates diagrammatically an electric device which may be utilized in conjunction with a suitably ruled record sheet permanently to record the pressure per square inch applied to the cylinder 3 to effect an indentation of predetermined depth. The anvils 6 are connected to a low voltage circuit L adapted, upon closure, by means of their coming into contact with the work, to energize an electro-magnet 25 which attracts an armature 26 causing it to close a high voltage circuit H. This latter circuit includes an induction coil 27, condenser 28 and the terminals $g^1$ and $g^2$ which latter constitute the movable spark-gap hereinbefore referred to. From the foregoing it will be perceived that instantaneously with the contact of the anvils 6 with the work the low voltage circuit will be closed and the magnet 25 energized, thereby attracting the armaure 26 which in turn closes the high voltage circuit causing a spark to jump across the spark gap. Inasmuch as the record sheet is located intermediate the terminals of the spark-gap and therefore in the path of the spark, the spark will, in its jump across the gap, pierce the record sheet, thereby permanently recording the elevation to which the spark-gap, carried by the rod 18, had been forced, in opposition to the spring 24, by the pressure in the cylinder 16 and as this pressure is equal to the pressure in the cylinder 3, per square inch, it will readily be perceived that by recording the pressure in the cylinder 16 the pressure in the cylinder 3 is determined. The record sheet may be ruled in any suitable manner to indicate, by the location of the puncture, the pressure required to effect the predetermined indentation.

The indentation having been made and the pressure utilized therefor recorded, upward pressure of the work against the anvils may continue until the pressure in the cylinder actuates an overload-switch thereby stopping the motor or until the pressure opens a suitable relief valve (not shown) set for a pressure in excess of the maximum pressure required, or further upward pressure may be prevented by discontinuing the flow of fluid into the cylinder 3. Various means may be employed automatically to shut off the flow of fluid and in the drawings there is illustrated one convenient electrically operated means for that purpose. Flow of fluid through the pipe 13 may be controlled by a valve V adapted to open and close a port 30 (see Fig. 7). This valve conveniently may be closed instantaneously upon contact of the anvils with the work by means of a solenoid 31 connected with and receiving electrical energy from the high voltage circuit H. Thus simultaneously with the closing of the circuit L by contact of the work with the anvils the magnet 25 will be energized thereby closing the circuit H. Upon closure of the latter circuit the core of the solenoid will be drawn inwardly thereby causing the valve V to close the port 30 and preventing further flow of fluid through the pipes 4 and 14. Also closure of the circuit H produces a spark across the spark-gap which registers the pressure utilized, as hereinbefore described. The valve V having closed, the motor and pump may be stopped in any suitable manner, such for example, as by a conventional overload switch, not shown.

The test having been made and recorded and the pump brought to rest the pressure in the cylinders 3 and 16 may be relieved by opening a valve 32 in a drain pipe 33 which connects the pipe 13 with the reservoir. With this drain open the weight of the piston 2 and the parts carried thereby will force the fluid beneath the piston back through the pipes 4, 13 and 33 into the reservoir. The back pressure being greater than the strength of the solenoid the valve V will be forced downwardly, opening the port 30. Likewise the pressure of the spring 24 will depress the piston 17 and force the fluid therebeneath back through the pipe 14 and finally to the reservoir. As the work moves out of contact with the anvils 6 the low voltage circuit L will be opened thereby de-energizing the magnet 25 and permitting a spring 34 to retract the armature 26, thereby opening the circuit H which in turn de-energizes the solenoid and permits the valve V to drop by gravity or otherwise.

The electrical energy for energizing the coils may be supplied from any suitable source, such for example as by batteries B and B¹ for the low and high voltage circuits respectively. These batteries, together with various other elements of the electrical apparatus may be housed within a suitable casing 35 secured to the upper portion of the frame F.

The spools 21 and 22, upon which the record sheet is rolled, are preferably carried by the bracket 15 and may be provided with spring controlled friction devices 21ᵃ and 22ᵃ respectively to maintain the sheet taut. In passage from one of the spools to the other the record sheet is led over pins or rollers 36 and 37 located adjacent the spark-gap at one side of a vertical plane intersecting the axis of the spools and which serve to hold the sheet rigid and accurately to guide it between the points of the spark-gap.

As herein used the term "indentation" is intended to mean "a local depression as made by a tool moved only at right angles to the surface of the work" as distinguished from a mark or scratch caused by lateral movement of a point while bearing upon the work.

From the foregoing it will be perceived that this invention provides an improved method of testing metal to determine and record its degree of hardness and also a practical machine adapted to utilize the new method.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. A testing machine combining a work-support; an indenting tool; means to effect relative movement between the tool and the work-support to cause the tool to indent the work carried by the work-support; a gauge to limit the extent of indentation by said tool; a normally inactive recording device adapted, upon actuation, to record the force utilized to effect the predetermined indentation in the work; and means rendered active by the contact of the work with said gauge to cause said recording device to be actuated.

2. A testing machine combining a work-support; an indenting tool; fluid-pressure actuated means to effect relative movement between the work-support and the tool to cause the tool to indent the work on the work-support; a recording device including an element movable by the pressure utilized to effect relative movement between the work and the tool; and means to discontinue the relative movement between the work and the tool when a predetermined indentation has been effected and simultaneously therewith to actuate said recording device to record the force utilized to effect the indentation.

3. A testing machine combining a work-support; an indenting tool; fluid-pressure actuated means to effect relative movement between the work-support and the tool to cause the tool to indent the work carried by the work-support; a gauge located back of the point of said tool and adapted to contact with the work to limit the extent of indentation by said tool; a recording device comprising a record sheet and a member movable relatively thereto and adapted to be moved by the fluid pressure utilized to effect relative movement between the work and the indenting point; and means controlled by the gauge to cause said movable member to permanently record, on said sheet, the force utilized to cause the point of said tool to indent the work to the depth determined by said gauge.

4. A testing machine combining a frame; a stationary indenting tool supported by said frame; a work-support carried by the frame and movable toward and from the indenting tool to cause the point of said tool to indent work carried by the work-support; a gauge adjacent said tool and adapted to contact with the work to limit the extent of indentation of said tool; means to apply fluid pressure beneath said work-support to move it toward said tool; and means to record the pressure utilized to cause the tool to indent the work sufficiently to cause the gauge to contact with the work, said recording means including a record sheet; a member adjacent said sheet and movable relatively thereto by a fluid pressure equal per square inch to that applied to the work-support; and means to register on said record sheet the position of a point on said member when the tool has effected its predetermined indentation.

5. A testing machine combining a work-support; an indenting tool; means to effect relative movement between said work-support and said tool to cause the tool to indent work on said work-support; means to record the force utilized to effect the predetermined indentation, said recording means comprising a record sheet, a member movable relatively to said record sheet and adapted to be moved by the force utilized to effect the indentation, a normally open electric circuit including spaced terminals carried by the movable member of said recording means at opposite sides of said record sheet, said terminals constituting a spark-gap; and means to close said circuit when the tool has indented the work to a predetermined depth, the closing of said circuit acting to send an electric current through said circuit and causing a spark to jump across said spark-gap thereby penetrating the paper and recording the position of said terminals at the instant the indentation was completed.

6. A testing machine combining a work-support; an indenting tool; power means to effect relative movement between the work-support and the tool to cause the tool to indent the work; a gauge to limit the extent of indentation by said tool; a recording device to record the force utilized to effect an indentation of predetermined depth; an electric circuit; and means actuated by contact between the work and the gauge to close said circuit, to render the power means ineffective and simultaneously therewith to cause said recording device to register the maximum force utilized.

7. A testing machine combining a work-support; an indenting tool; means to effect relative movement between said tool and the work-support to cause the tool to indent the work; a recording device including a record sheet and a member movable relatively thereto and provided with a recording point; a common source of power adapted to force the point of the indenting tool into the work and simultaneously therewith to move said member adjacent said record sheet; and means automatically rendered effective when the point has indented the work to a predetermined depth to render the power ineffective to cause the tool further to indent the work and to cause the movable member of the recording device to register the position of said recording point with respect to the record sheet.

8. A testing machine combining a frame providing a cylinder; a piston movable in said cylinder; a work-support carried by the piston; an indenting tool opposed to said work-support; means to admit fluid under pressure behind said piston to cause it first to move the work carried by said work-support into contact with the indenting tool and then to force the point of said tool into the work; a recording device to register the presure within said cylinder, said recording device including a record sheet; a second cylinder; a member movable in said second cylinder and carrying a recording point adjacent said record sheet; means to admit fluid under pressure into said second cylinder to move said movable member; a common source of supply for the fluid pressure for both of said cylinders; and means rendered effective when the tool has indented the work to a predetermined depth to cause an electric spark to pass from said recording point through said record sheet to record the position of said point with respect to said sheet.

9. A machine for testing metal combining a frame; an indenting tool carried thereby; a universally supported work-table; means to apply fluid pressure to one of said members to effect relative movement between said work-table and said tool to cause the tool to indent the work on said table; a depth gauge to predetermine the extent of indentation by said tool, said depth gauge comprising anvils located at opposite sides of indenting tool and having work engaging surfaces slightly back of the point of said tool, said work table, by means of its universal support, being adapted to yield to the pressure of the first contacting anvil to insure that both of said anvils will be brought into contact with the work accurately to determine the depth of the indentation; and means to measure and record the amount of pressure utilized to effect the predetermined indentation.

10. A machine for testing metal combining a frame; an indenting tool carried thereby; a work supporting table; fluid pressure means for effecting relative movement between the tool and the work-table to cause the tool to indent the work on said table; means to limit the extent of indentation by said tool, said means comprising two anvils located at opposite sides of said indenting tool and having work engaging surfaces slightly back of the point of said tool, said units being electrically insulated from each other; means to measure the force utilized to effect the predetermined indentation; and an electrically controlled recording device adapted permanently to record the force utilized, said recording device including an electric circuit connected with said anvils and adapted to be closed by the contact of said work with said anvils.

11. A testing machine combining a stationary indenting tool; a cylinder; a work-support having a portion movable in said cylinder; a fluid pressure line adapted to admit fluid under pressure into said cylinder to move said work-support toward said tool thereby to cause the tool to indent the work carried by the work-support; a depth gauge to limit the depth of the indentation; means to measure and record the pressure utilized to effect the indentation; said measuring and recording means including a second cylinder; a piston movable in said second cylinder; a pipe connecting said fluid pressure line with said second cylinder to maintain a pressure therein behind said piston substantially equal to the pressure in the first named cylinder; a record sheet; a recording element movable with said piston and maintained adjacent said record sheet; and means to cause said element to record on said record sheet the position that it occupies when the indentation is completed.

12. A testing machine combining an indenting tool; a cylinder; a movable work-support having a portion movable in said cylinder; a pressure line to convey fluid under pressure into said cylinder first to move said work-support to cause the work thereon to be brought into contact with the indenting tool and then to force the tool into the work; a depth gauge to limit the depth of the indentation; means to measure the fluid pressure utilized to effect the indentation, said means including a second cylinder; a piston movable in said second cylinder; a record sheet; spaced electrical terminals located at opposite sides of said sheet and constituting a spark-gap; a pipe connecting said second cylinder with said pressure line whereby pressure is maintained in said cylinder substantially equal to the pressure in said first named cylinder; a back pressure device acting upon said piston to prevent it from moving under the influence of said fluid pressure until after the work has contacted with the indenting tool and then permitting it to yield with the indenting pressure; and means to cause an electric spark to jump said gap when the indentation is completed.

13. A testing machine combining a work-support; an indenting tool; a fluid pressure system; means actuated from said system to effect relative movement between the work-support and the tool first to move the work into contact with the tool and then to cause the tool to indent the work; a device to measure and record the pressure utilized to cause an indentation of predetermined depth, said device including a cylinder; a piston movable in said cylinder; a connection between said cylinder and said pressure system to conduct fluid under pressure from said system into said cylinder to effect movement of said piston; a spring acting upon said piston in opposition to said pressure system to prevent movement of said piston until after the tool contacts with the work; a record sheet; an electric circuit including spaced terminals comprising a spark-gap, arranged at opposite sides of the record sheet and movable with said piston; and means to cause an electric spark to jump said gap thereby to pierce the record sheet instantaneously with the completion of the predetermined indentation.

14. A testing machine combining a work-support; an indenting tool; a fluid pressure system; means actuated by pressure from said system to effect relative movement between the tool and the work-support to cause said tool to indent the work on said work-support; means to limit the extent of indentation to a predetermined depth; a device to measure and record the pressure utilized to effect the predetermined indentation, said device comprising a record sheet; an electric circuit including spaced terminals located at opposite sides of said sheet and constituting a spark-gap; means to move said spark-gap relatively to said record sheet by the pressure utilized to effect the indentation; and means to cause a spark to jump said gap and penetrate said sheet instantaneously with the completion of said indentation.

15. A testing machine combining a work-support; an indenting tool; means to effect relative movement between the tool and the work-support to cause the tool to indent the work on said work-support; fixed anvils located adjacent the tool and comprising a positive stop adapted to engage the work when the tool has indented the work to a predetermined depth, thereby to discontinue the indentation by said tool; and means to record the force required to bring the work into contact with said anvils.

In witness whereof, I have hereunto subscribed my name.

ADOLPH L. DE LEEUW.